United States Patent
Brown

(10) Patent No.: US 12,403,875 B2
(45) Date of Patent: Sep. 2, 2025

(54) METHOD FOR DISCRETE HANDLING OF BRAKE CONTROL BETWEEN DRIVER AND MECHANICAL SYSTEM

(71) Applicant: Toyota Jidosha Kabushiki Kaisha, Aichi-ken (JP)

(72) Inventor: Matthew J. Brown, Palo Alto, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 18/428,433

(22) Filed: Jan. 31, 2024

(65) Prior Publication Data

US 2025/0242786 A1    Jul. 31, 2025

(51) Int. Cl.
*B60T 8/32*    (2006.01)
*B60T 7/04*    (2006.01)
*B60T 7/12*    (2006.01)
*B60T 8/92*    (2006.01)

(52) U.S. Cl.
CPC ............ *B60T 8/3255* (2013.01); *B60T 7/042* (2013.01); *B60T 7/12* (2013.01); *B60T 8/3275* (2013.01)

(58) Field of Classification Search
CPC ...... B60T 8/3255; B60T 7/042; B60T 8/3275; B60T 2201/03; B60T 7/12; B60T 8/86; B60T 8/92
See application file for complete search history.

(56) References Cited

U.S. PATENT DOCUMENTS

| | | | |
|---|---|---|---|
| 10,501,064 B2 | 12/2019 | Pinto et al. | |
| 10,960,868 B2 | 3/2021 | Dagan | |
| 11,249,506 B1 * | 2/2022 | Kim | B60T 7/06 |
| 2004/0249546 A1 * | 12/2004 | Zielke | G08G 1/166 |
| | | | 340/436 |
| 2012/0239265 A1 * | 9/2012 | Kato | B60W 10/188 |
| | | | 701/70 |
| 2022/0234552 A1 | 7/2022 | Miranda et al. | |
| 2022/0234557 A1 * | 7/2022 | Kang | B60T 8/245 |

FOREIGN PATENT DOCUMENTS

| | | |
|---|---|---|
| CN | 117022205 A | 11/2023 |
| WO | 2023135851 A1 | 7/2023 |

\* cited by examiner

*Primary Examiner* — Jacob M Amick
(74) *Attorney, Agent, or Firm* — DINSMORE & SHOHL LLP

(57) ABSTRACT

A system for controlling a braking system of a vehicle includes monitoring a manually applied braking value based on a displacement of a brake pedal mechanically coupled to brake calipers; determining that an additional braking value is needed to provide a needed total braking value; in response to determining that the additional braking value is needed, applying a controller braking value as the additional braking value by actuating an actuator to physically move the brake pedal away from a foot of a driver; decaying the manually applied braking value while the controller braking value is applied; detecting, using vehicle sensors coupled to a controller, that application of the total needed braking value results in an updated vehicle trajectory that satisfies predetermined braking threshold criteria; and incrementally decreasing the controller braking value and incrementally increasing the manually applied braking value such that the brake pedal incrementally returns to the driver's foot.

19 Claims, 8 Drawing Sheets

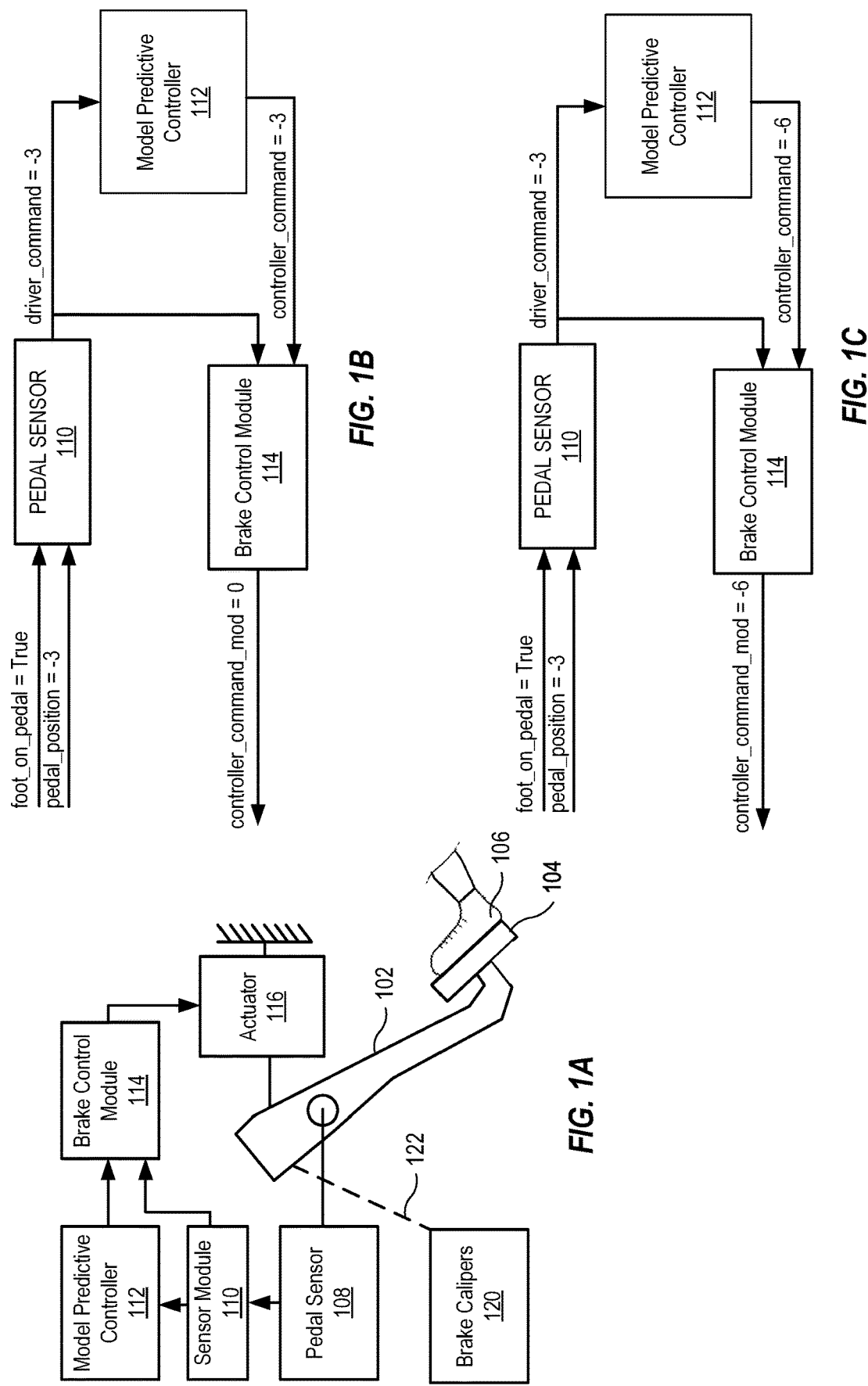

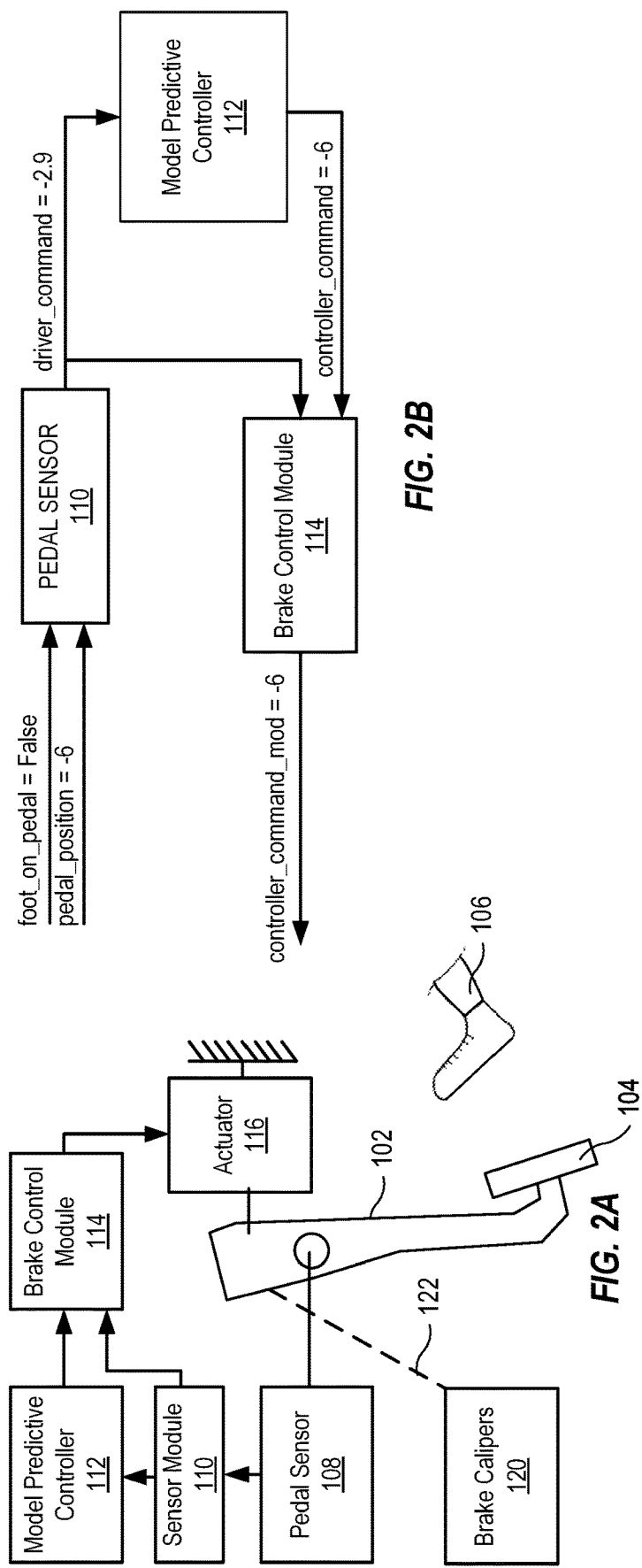

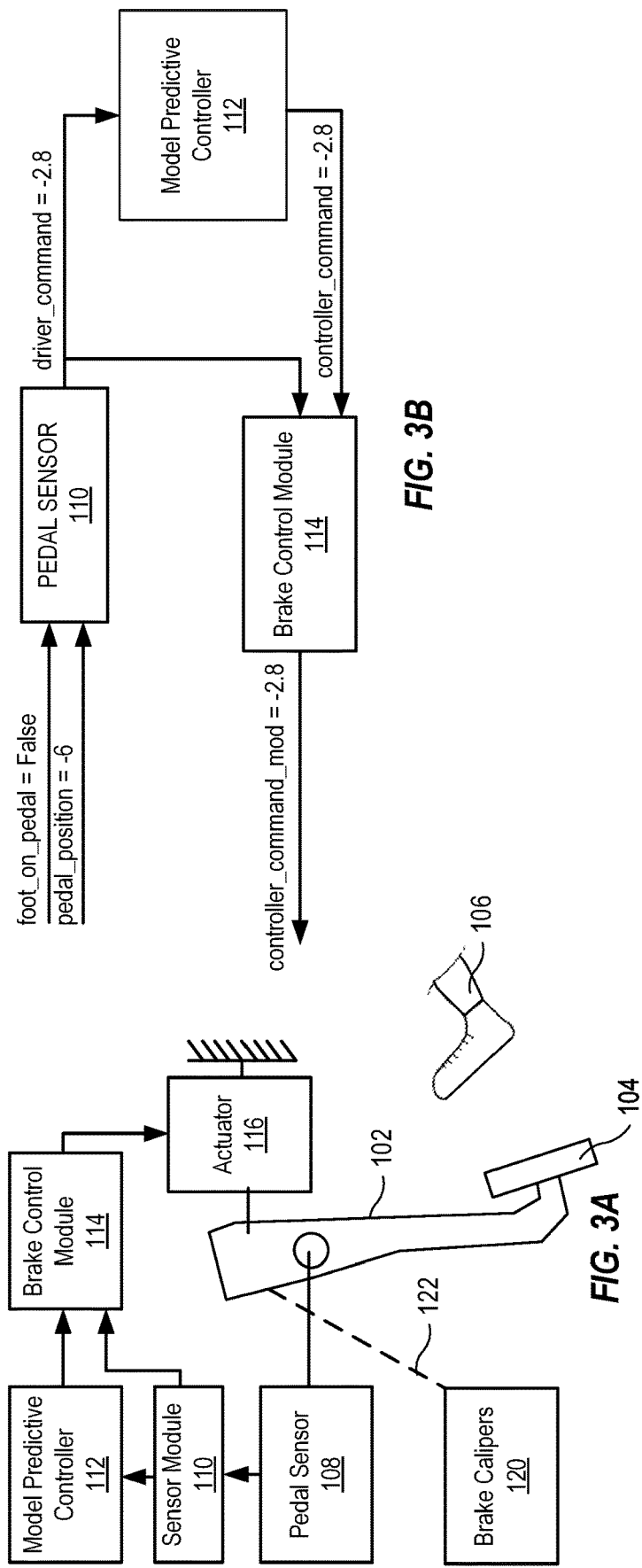

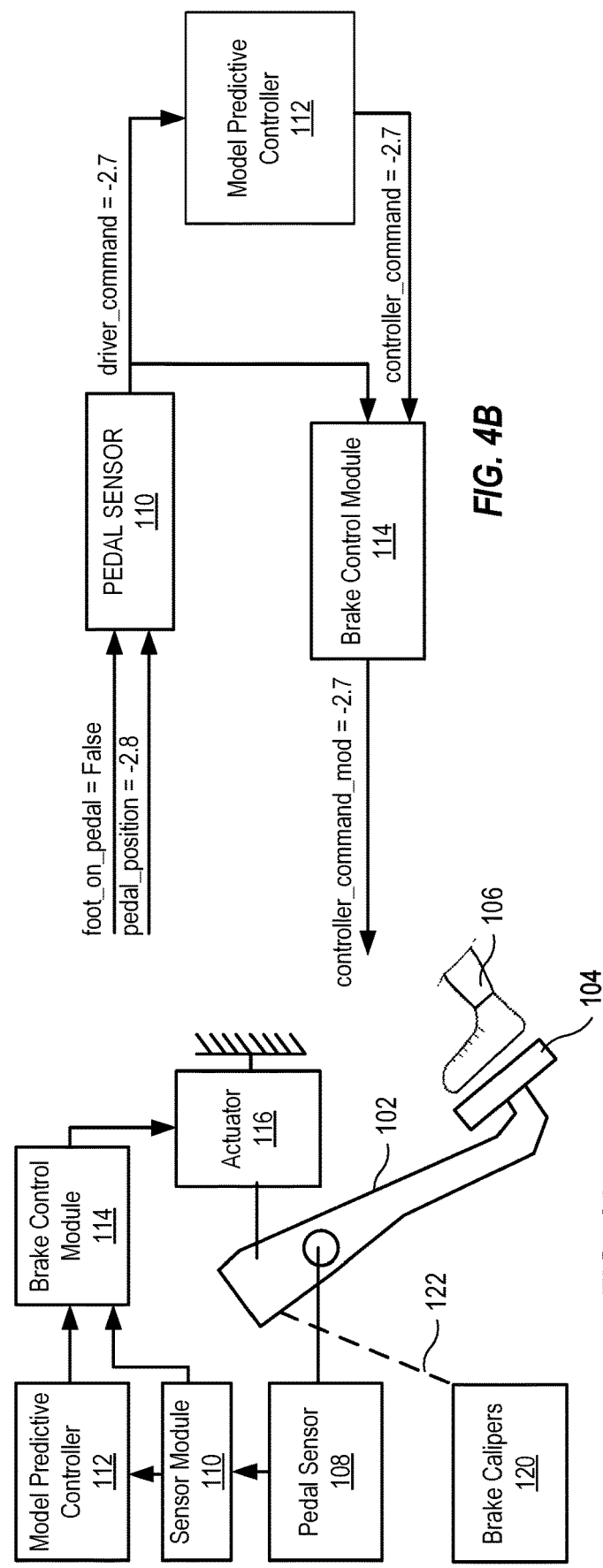

METHOD FOR DISCRETE HANDLING OF BRAKE CONTROL BETWEEN DRIVER AND MECHANICAL SYSTEM

TECHNICAL FIELD

The present specification generally relates to systems and methods for handling brake control in an automobile and, more specifically, systems and methods for handling brake control between a driver and a mechanical system of an automobile.

BACKGROUND

Autonomous vehicle stability control systems can supplement driver braking inputs when additional deceleration is determined to be required. Applying these supplementary braking forces is straightforward in "brake-by-wire" configurations, where there is no direct mechanical coupling between the brake pedal positioned by the driver's foot and the hydraulic actuation of the brake calipers themselves. In such brake-by-wire vehicles, blending the driver's attempted manual braking command with additional autonomous braking input directives calculated by the vehicle stability control system can be readily achieved by modulating hydraulic line pressures fed to the calipers. However, in vehicles retaining conventional hydraulic braking architectures, there exists a mechanical linkage between the pedal depressed by the human driver and the hydraulic activation of the brake calipers.

Accordingly, a need exists for temporarily controlling a braking system of a vehicle having a mechanical linkage between the brake pedal depressed by a human driver and brake calipers.

SUMMARY

In one embodiment, a system for a controlling braking system of a vehicle includes a brake pedal mechanically coupled to brake calipers; a pedal displacement sensor configured to monitor brake pedal displacement; a pedal contact sensor configured to detect contact between the brake pedal and a foot of a driver; vehicle sensors configured to measure vehicle parameters; and a controller in communication with the pedal displacement sensor, the pedal contact sensor, and the vehicle sensors. In examples, the controller is configured to determine a manually applied braking value based on the brake pedal displacement; determine an additional braking value based on the vehicle parameters; based on the additional braking value, control an actuator to physically move the brake pedal away from a driver's foot and apply a controller braking value; decrease the controller braking value based on the vehicle parameters; and increase the manually applied braking value as the controller braking value decreases until the an indication received from the pedal contact sensor indicates the brake pedal is in contact with the foot of the driver.

In another embodiment, a method for controlling a braking system of a vehicle includes monitoring a manually applied braking value based on a displacement of a brake pedal mechanically coupled to brake calipers; determining that an additional braking value is needed to provide a needed total braking value; in response to determining that the additional braking value is needed, applying a controller braking value as the additional braking value by actuating an actuator to physically move the brake pedal away from a foot of a driver; decaying the manually applied braking value while the controller braking value is applied; detecting, using vehicle sensors coupled to a controller, that application of the total needed braking value results in an updated vehicle trajectory that satisfies predetermined braking threshold criteria; and after detecting that the updated vehicle trajectory satisfies the predetermined braking threshold criteria, incrementally decreasing the controller braking value and incrementally increasing the manually applied braking value such that the brake pedal incrementally returns to the driver's foot.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 1A-1C generally depict an example braking control system according to one or more embodiments shown and described herein;

FIGS. 2A-2B generally depict an example braking control system according to one or more embodiments shown and described herein;

FIGS. 3A-3B generally depict an example braking control system according to one or more embodiments shown and described herein;

FIGS. 4A-4B generally depict an example braking control system according to one or more embodiments shown and described herein;

DETAILED DESCRIPTION

Figures 5A, 5B:
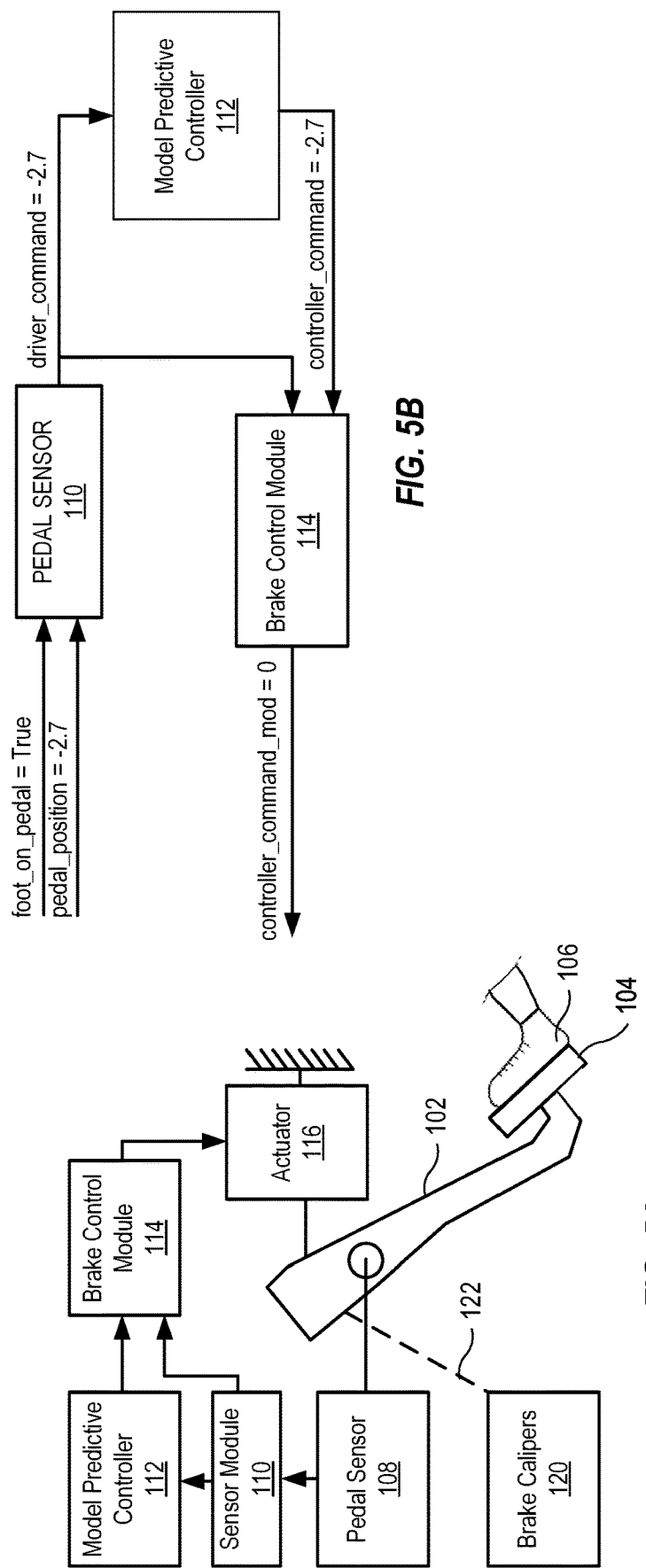
FIGS. 5A-5B generally depict an example braking control system according to one or more embodiments shown and described herein.

Embodiments disclosed herein are directed to systems and methods for blended brake control between a driver's manual inputs and autonomous braking assistance. In vehicles having a brake pedal that is mechanically connected to brake calipers, vehicle sensors feed data to a model predictive controller that calculates optimal braking forces needed to maintain a desired vehicle trajectory, ensuring that the vehicle trajectory satisfies a predetermined braking threshold criteria. If additional braking beyond manual input is required, a pedal actuator forcibly displaces the pedal to further depress it, moving it away from the driver's foot. This acts to apply increased hydraulic pressure to the brake calipers through brake fluid lines, and/or heightened cable pull force via a brake cable, beyond the hydraulic pressure and cable force corresponding to the initial manual pedal input from the driver. Manual braking command signals detected from pedal displacement are gradually decayed while supplemental automated braking assistance signals increase. Once one or more sensors indicate the vehicle trajectory satisfies the predetermined braking threshold criteria, the pedal actuator can incrementally return the brake pedal towards the driver's foot as the automated braking assistance input decays. Handoff back to full manual operation is completed when pedal contact with the driver's foot is reestablished. Various embodiments of the methods and systems for a blended brake control between a driver's manual inputs and autonomous braking assistance are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Turning to FIG. 1A, the braking control system 100 includes a brake pedal 104 mechanically coupled via a fixed mechanical linkage 122 to brake calipers 120. In one example, the mechanical linkage 122 comprises a hydraulic line connection between the brake pedal 104 and brake calipers 120. For instance, displacement of the brake pedal 104 actuates a master cylinder applying fluid pressure through hydraulic lines to slave cylinders at the brake calipers 120. In another example, the mechanical linkage 122 may comprise a mechanical cable such as a brake cable running from the brake pedal 104 to a linkage actuating the brake calipers 120. Other fixed linkages like pneumatic pressure lines, gear mechanisms, or pushrods may couple pedal displacement to brake actuation. The braking control system 100 further includes a pedal sensor 108, a sensor module 110, a model predictive controller 112, a brake control module 114, and a pedal actuator 116.

The pedal sensor 108 continually monitors displacement of the brake pedal 104 from a non-depressed position and generates a pedal position signal indicative of real-time pedal displacement amount. The pedal sensor 108 may incorporate any type of displacement sensor known in the art, such as a linear potentiometer, linear variable differential transformer (LVDT), optical encoder, or other displacement transducer. In some embodiments, the pedal sensor 108 outputs an electrical signal that corresponds to real-time brake pedal displacement. This displacement signal serves as the primary input to determine the driver's desired manual braking command. In examples, the pedal position signal is an electrical signal quantifying brake pedal displacement on a standardized braking force scale of 0 to −10, with 0 representing no braking and −10 representing maximum braking command. The pedal sensor 108 further outputs a binary pedal contact signal indicating physical detection of contact between a driver's foot and the brake pedal 104.

The sensor module 110 includes various vehicle condition sensors that provide ongoing sensor feedback signals to the model predictive controller 112, including wheel speed sensors, proximity sensors, inertial sensors, etc. The model predictive controller 112 utilizes the sensor signals along with integrated control models to calculate an optimal vehicle trajectory meeting pre-defined acceptable stopping distance objectives and stability criteria. For example, the model predictive controller can calculate a vehicle trajectory that satisfies a predetermined braking threshold criteria. A predetermined braking threshold criteria may ensure an acceptable stopping distance based on measured vehicle speed and obstacle proximity. The model predictive controller 112 calculates when supplemental automated braking is required to change the current vehicle trajectory and achieve a new trajectory that satisfies the braking distance threshold relative to a detected obstacle. In essence, the model predictive controller 112 continually leverages various sensor inputs to determine if/when additional braking is required to keep the vehicle trajectory within constraints that avoid collisions and maintain stability.

The model predictive controller 112 continually outputs a controller command signal indicating a total desired braking force level based on processing the sensor inputs and predictive control objectives. For example, the model predictive controller 112 combines the current vehicle state based on sensor measurements (velocity, proximity, wheel slip etc.), known vehicle dynamics models (friction limits, inertia factors etc.), predefined optimal and stable trajectory functions, and acceptable braking distance constraints via one or more model predictive control algorithms, to calculate the overall braking forces needed to change the current vehicle trajectory and achieve a new trajectory that satisfies stability and acceptable stopping distance objectives. The controller command signal quantifies the calculated braking forces needed on the same standardized 0 to −10 scale as the pedal position signal.

In some examples, the model predictive controller has embedded within its optimized control logic a set of pre-defined braking threshold criteria that encode acceptable stopping distance constraints for stable vehicle trajectory. These thresholds reflect limits on variables related to braking requirements, including but not limited to: longitudinal deceleration (thresholds on acceptable rates of braking-related slowing down, based on road conditions to prevent unstable skidding), stopping distance (constraints calculated on minimum allowed stopping distance at current instantaneous vehicle speed, taking into account controller-estimated friction coefficient, which ensures collision avoidance), object proximity buffer (acceptable offset distance from a detected object/obstacle required for the current trajectory and can be tied to vehicular inertial constraints), wheel slip thresholds (limits on measured wheel slip ratios indicating retention of grip vs skidding risk during braking). The model predictive controller continually monitors sensor inputs like vehicle speed, object radar detections, accelerometers, and wheel rotation against these encoded threshold constraints. If the current vehicle trajectory violates any predefined criteria, indicating an unacceptable stopping distance if maintained, the model predictive controller automatically calculates the additional braking forces required to modify the trajectory and satisfy the braking constraints again.

The brake control module 114 receives and processes the pedal position signal as a driver manual braking command signal and the controller command signal as an automatic controller braking command signal. In examples, the brake control module 114 correlates the manual braking command to hydraulic pressure fed to the brake calipers 120 under normal operation. In another example, the brake control module 114 correlates the manual braking command to a cable force enacted on the brake calipers 120 under normal operation. That is, the brake control module 114 serves as the central processor receiving and comparing the manual braking and automated braking command signals. In some examples, the brake control module 114 continually receives the pedal position signal from the pedal sensor 108 and the controller command signal from the model predictive controller 112. The pedal position signal indicates the brake pedal displacement amount applied by the driver and serves as the driver manual braking command signal. The controller command signal from the model predictive controller 112 indicates total calculated braking forces needed to achieve stability objectives, such as to satisfy a predetermined braking threshold criteria. This serves as the automatic controller braking command signal.

Under normal driving conditions when only driver braking input is required, the brake control module 114 directly correlates the pedal position signal to a corresponding hydraulic pressure or cable force fed through or otherwise coupled to a fixed mechanical linkage to actuate the brake calipers 120. This achieves standard braking operation per the displacement of the brake pedal. However, under vehicle conditions requiring braking input beyond the driver's attempted manual input, the brake control module 114 determines a modified command signal by comparing the manual braking signal and the controller braking signal. Based on the modified command signal, the brake control module 114 directs the pedal actuator 116 to further depress the brake pedal 104.

The pedal actuator 116 receives the modified command signal from the brake control module 114 and actuates the brake pedal 104 to displace the brake pedal 104 beyond the amount determined by the driver's input. This increases hydraulic pressure or cable force beyond what would occur from just the actual pedal displacement applied by the driver. In this way, automated control can supplement the driver's attempted manual braking command.

As the pedal actuator 116 moves the brake pedal 104 away from the driver's foot, braking forces increase due solely to further pedal depression under automated control, until the vehicle trajectory stability criteria are satisfied as determined by the model predictive controller 112 through sensor module 110 signal analysis. As the pedal actuator 116 physically displaces the brake pedal 104 beyond the driver's input, it moves the pedal away from the driver's foot per the controller command signal. This causes further depression of the brake pedal, increasing hydraulic pressure in the brake lines or otherwise causing the brake calipers 120 to exert additional force as part of the braking system.

This supplemental automated braking control continues, with the pedal actuator 116 holding brake pedal displacement at the level dictated by the controller command signal. The model predictive controller 112 continually analyzes updated sensor measurements from the sensor module 110 assessing vehicle movement and stability. Once the sensor signals indicate the vehicle trajectory has been changed to meet defined obstacle avoidance and stability control criteria, the model predictive controller 112 updates the controller command signal. The model predictive controller 112 incrementally attenuates the total commanded braking force output, to reflect that the maximum amount of supplemental automated input has succeeded in redirecting the vehicle trajectory within acceptable stopping distance thresholds.

As the controller command decrements the braking value, the pedal actuator 116 correspondingly allows the brake pedal 104 to begin rebounding back toward the driver's foot, enabling gradual transfer of braking control authority. That is, the pedal actuator 116 then incrementally reduces the supplemental automated braking command signal input while allowing the brake pedal 104 to rebound toward the driver's foot as the supplemental braking input decays.

Additional directed to the supplementary automated braking control is described in FIGS. 2A and 2B. That is, as the supplementary automated braking control initiates, the pedal actuator 116 further depresses the brake pedal 104 beyond the driver's manual input, as dictated by the controller command signal. This increases hydraulic pressure supplied to the brake calipers for heightened braking forces. Concurrently, the pedal sensor 108 continues measuring the attempted manual braking command by monitoring pedal displacement amount. However, this driver pedal displacement input is now overridden by the pedal actuator 116 and unable to directly correlate with pressure applied at the brake calipers 120. The brake control module 114 tracks the unsupported manual input as it gradually decays, as the driver releases the depressed pedal allowing some rebound. That is, the pedal displacement itself induced by the driver is disconnected or overridden from actuating the brakes, because the pedal actuator 116 has taken over applying extra displacement per the controller command.

In addition, braking forces increase due solely to the pedal actuator 116 further depressing the pedal under control of the model predictive controller 112 automated commands. This temporary state increases braking based primarily on supplementing the manual input to ensure the vehicle trajectory satisfies stability criteria. In this manner, manual and supplemental automated braking commands are blended—the manual input decays out while supplemental automated input increases. The crossover timing can be predetermined to transition control smoothly. The brake pedal 104 is forced further away from the driver's foot 106 by the amount dictated by the model predictive controller 112 to apply the calculated braking level.

As shown in FIG. 2B, the controller command remains at an increased braking value of −6, while the disconnected driver command has decayed to −2.8. Therefore, the pedal actuator 116 maintains pedal displacement corresponding to the −6 controller command value specified by the model predictive controller 112.

Following the initial automated braking assistance shown in FIG. 2A, FIG. 3A illustrates the system at a later stage where supplemental support is still sustained, but partially attenuated. The matched controller command and modified command signals at a value of −2.8 reflects that the model predictive controller 112 continues determining through sensor data processing that some automated braking input, although reduced, remains necessary to ensure the vehicle trajectory satisfies stability criteria. Furthermore, the pedal contact signal still indicates no detection of the driver's foot touching the pedal. However, the amount of braking intervention has decreased from FIG. 2A.

As shown in FIG. 3A, the brake pedal, while still displaced to position −6, is rebounding closer towards the driver's foot as reflected by the gradual reduction in the modified command signal. This demonstrates both manual and supplemental automated inputs are being scaled back as the system 100 begins transferring control authority to the driver. Subsequently, FIGS. 4A-4B illustrate the system at a following stage when supplemental support nears conclusion. The matched controller, manual, and modified command signals register −2.7, reflecting only minimal further braking required to ensure the vehicle trajectory satisfies predetermined braking threshold criteria. Accordingly, the brake pedal 104 has partially rebounded under control and is closer to the driver's foot while still separated. This rebound aligns with the decrementing automated braking input.

Through coordinated tapering of both control inputs (e.g., driver command and controller command), braking authority transitions back to the driver. The brake pedal 104 is positioned to directly contact the driver's foot again, enabling resumption of unassisted manual operation.

Figure 6:
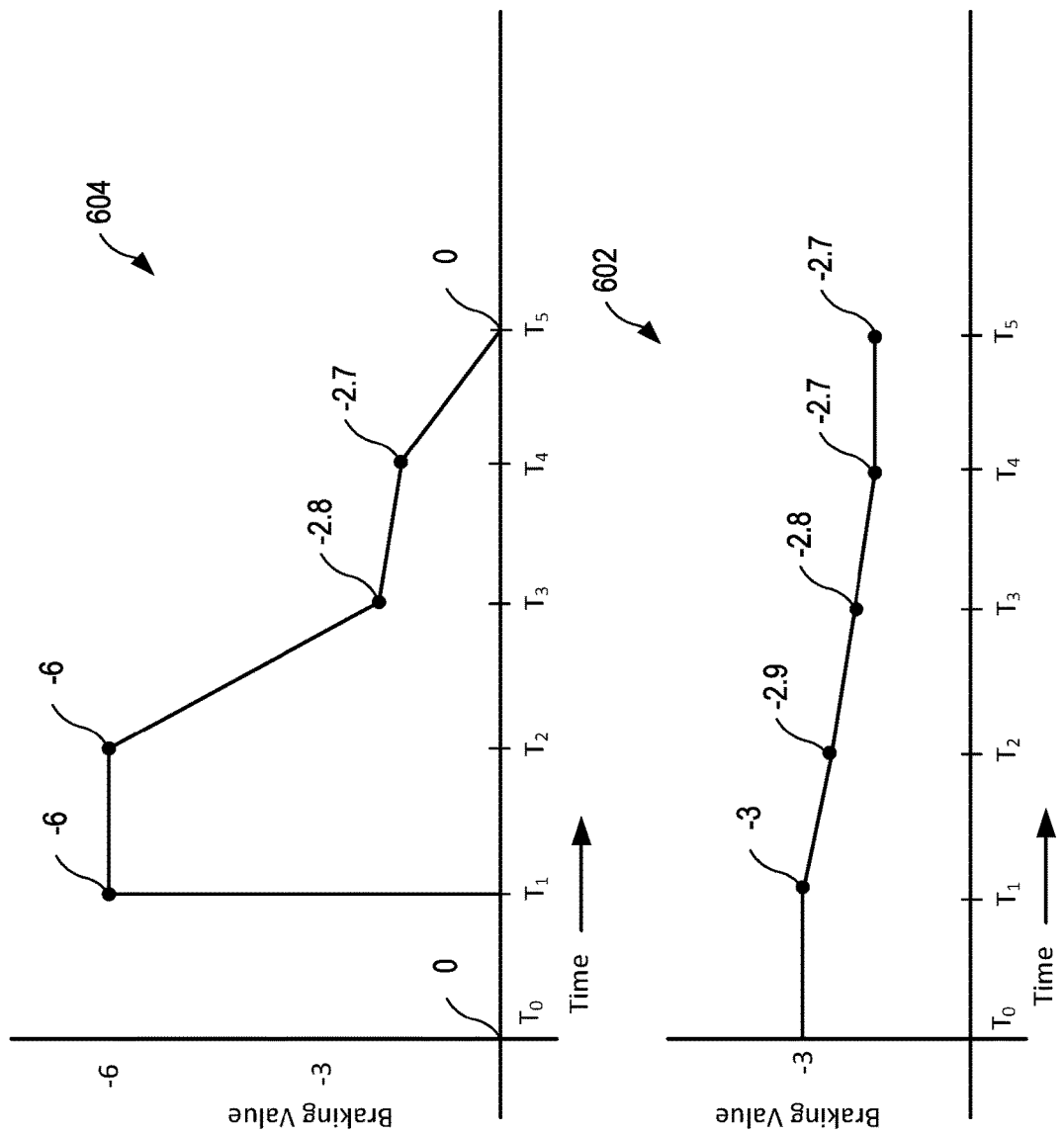
FIG. 6 generally depicts the relationship between the driver manual braking command and the brake control module command according to one or more embodiments shown and described herein.

FIG. 6 graphically illustrates the relationship between the driver manual braking command represented by signal 602 and the supplemental automated controller braking command represented by signal 604 over time. At point $T_0$, manual and automated commands are the same, for example, both registering a value of −2. This represents steady-state manual driving operation prior to any supplemental automated braking control intervention. In examples, the brake control module 114 may output a controller_command_mod value equal to zero.

Then at point $T_1$, due to vehicle sensors indicating the vehicle trajectory does not satisfy a predetermined braking threshold criteria, such as an obstacle entering minimum proximity threshold, the model predictive controller 112 calculates a braking force required that is beyond the current manual input. The model predictive controller 112 generates signal comprising the total amount of braking required to ensure a change in vehicle trajectory (e.g., braking) will satisfy a predetermined braking threshold criteria. Accordingly, the brake control module 114 selects the model predictive controller's 112 generated braking value of −6 and outputs it as the controller_command_mod. Accordingly, braking control transitions to temporarily being controlled by the brake control module 114. Signal 602 depicting the manual driver input (driver_command) then begins a controlled decay over a calibrated timeline between $T_1$ and $T_2$. Simultaneously, controller_command_mod signal 604 increases braking forces to the necessary value dictated by the model predictive controller, shown reaching −6.

At point $T_3$, the modified vehicle trajectory does satisfy a predetermined braking threshold criteria according to sensor inputs processed by the model predictive controller 112. Signal 604 thus begins tapering its supplemented braking command to return braking control/authority to the driver. At point $T_4$, the decayed manual signal and controller_command_mod signals intersect as braking control is about to be returned to the driver. From $T_4$ to endpoint $T_5$, a driver's foot is detected on the brake pedal the signal 602 and braking control is returned to the driver at $T_5$.

Figure 7:
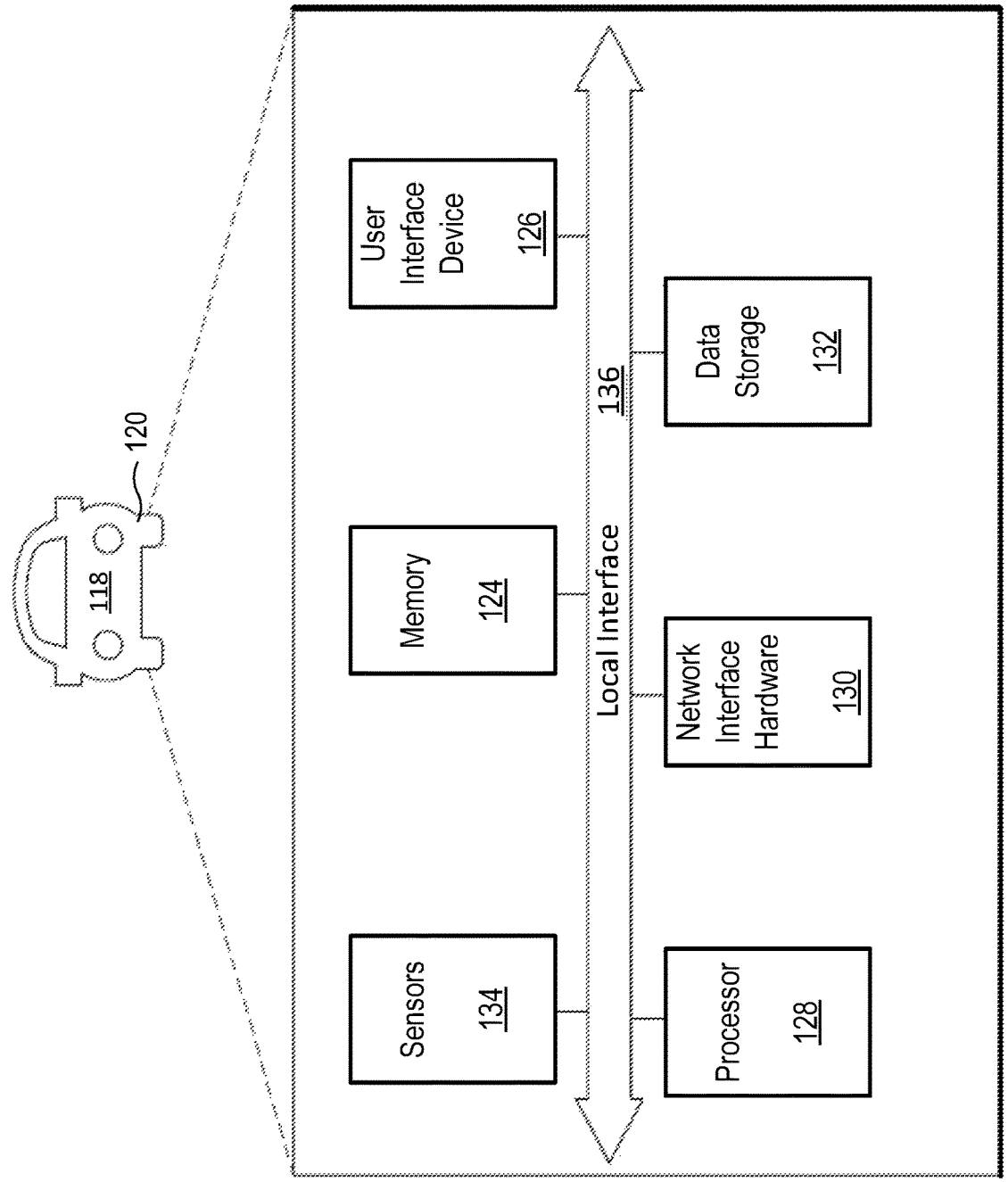
FIG. 7 schematically depicts non-limiting components of the devices on the braking control system of FIG. 1, according to one or more embodiments shown and described herein.

Referring to FIG. 7, non-limiting components of the devices on the vehicle 118 of the example braking control system 100 are depicted. The vehicle 118 may comprise various components, such as a memory 124, a vehicle processor 128, a user interface device 126, a network interface hardware 130, a data storage component 132, and vehicle sensors 134.

The vehicle 118 may include a controller that may be any device or combination of components comprising a vehicle processor 128 and a memory 631, such as a non-transitory computer readable memory. The vehicle processor 128 may be any device capable of executing the machine-readable instruction set stored in the non-transitory computer readable memory. Accordingly, the vehicle processor 128 may be an electric controller, an integrated circuit, a microchip, a computer, or any other computing device. The vehicle processor 128 may include any processing component(s) configured to receive and execute programming instructions (such as from the data storage component 132 and/or the memory 124). The instructions may be in the form of a machine-readable instruction set stored in the data storage component 132 and/or the memory 124. The vehicle processor 128 is communicatively coupled to the other components of the controller by the local interface 136. Accordingly, the local interface 136 may communicatively couple any number of vehicle processors 128 with one another, and allow the components coupled to the local interface 136 to operate in a distributed computing environment. The local interface 136 may be implemented as a bus or other interface to facilitate communication among the components of the vehicle 118. In some embodiments, each of the components may operate as a node that may send and/or receive data. While the embodiment depicted in FIG. 7 includes a single processor, other embodiments may include more than one processor. While the embodiment depicted in FIG. 7 includes a single non-transitory computer-readable memory, other embodiments may include more than one memory.

The vehicle 118 and/or system 100 may include a user interface device 126. The user interface device 126 may be associated with or implemented as part of the vehicle 118. In other embodiments, the user interface device 126 may be a remote device (e.g., mobile device, laptop, desktop, tablet, etc.). A user interface device 126 associated with the vehicle 118 is a device or technology that can be used in a vehicle 118 to provide various functions and services to the user. In embodiments, these devices can be installed in the vehicle 118, connected to the processor 633 of the vehicle 118 and/or communicate directly or wirelessly via the local interface 136. Some examples of vehicle user devices include in-vehicle infotainment systems (IVI), heads-up displays (HUD), rear-seat entertainment systems, smartphone integration systems, and/or the like. These devices can be used for a variety of purposes such as navigation, entertainment, communication, and vehicle management. In embodiments, the user interface device 126 may be used to provide braking information to a user. Further, the user interface device 126 may be communicatively coupled to the other components of the system 100 through the network interface hardware 130, or the local interface 136.

The system 100 and/or vehicle 118 may include one or more vehicle sensors 134 configured to output vehicle data. In embodiments the vehicle data is generated by vehicle processor 128 and stored within the memory 631 of the vehicle 118 and within the data storage component 132, as described below.

The one or more vehicle sensors 134 may include, but are not limited to, proximity sensors, microphones or audio sensors, one or more cameras, a global positioning system (GPS), weather sensors, speed sensors, steering wheel sensors, LIDAR and RADAR systems, vehicle API and UI, vehicle-to-vehicle communication paths, vehicle telematics sensors (e.g., acceleration sensors, braking sensors, steering sensors, yaw sensors, fuel consumption sensors, accident sensors, lane departure sensors, impact sensors, etc.), and the like. These sensors may collect data, such as but not limited to, acceleration data, braking data, steering data, brake usage, lane departures, routes, time, location, fuel consumption, idling, distance traveled, accidents, historical location data, current accessory data, software data, occupant data, and the like.

A proximity sensor may be any device or combination of components capable of outputting a signal indicative of the presence or absence of an object within or near the vehicle 118. The proximity sensor may also be a sensor capable of determining a range or distance to an object, for example the distance from the vehicle and another vehicle that is traveling in front of the vehicle 118. In some embodiments, one or more proximity sensors may be configured to enable an around view monitoring system for the vehicle 118.

A microphone or audio sensor may be any device capable of transforming a mechanical vibration associated with sound into an electrical signal indicative of the sound. In embodiments, the microphone may be used to monitor sound levels for purposes such as determining the existence of traffic, infotainment settings, etc. In other embodiments, the microphone may be used to monitor words spoken within the vehicle 118 that may indicate desires of a driver or occupants of the vehicle 118.

The one or more cameras may enable a variety of different monitoring, detection, control, and/or warning systems within a vehicle 118. The one or more cameras may be any device having an array of sensing devices (e.g., a CCD array or active pixel sensors) capable of detecting radiation in an ultraviolet wavelength band, a visible light wavelength band, or an infrared wavelength band.

The global positioning system, or GPS, is capable of generating location information indicative of a location of the vehicle 118 by receiving one or more GPS signals from one or more GPS satellites. In embodiments, the GPS signal is communicated to the vehicle processor 128. The signal may include location information comprising a National Marine Electronics Association (NMEA) message, a latitude and longitude data set, a street address, a name of a known location based on a location database, or the like. Additionally, the GPS may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Weather sensors may be temperature sensors, precipitation gauges, wind meters, UV light sensors, or the like. The weather sensors may be any device capable of outputting a signal indicative of a weather condition such as a temperature level, the presence or an amount of precipitation, the direction and/or speed of the wind, the presence and/or intensity of sunlight or the like. Weather sensors may provide information which may be relevant to driving conditions of the vehicle 118.

A vehicle speed sensor may be any sensor or system of sensors for generating a signal indicative of vehicle speed. For example, without limitation, a vehicle speed sensor may be a tachometer that is capable of generating a signal indicative of a rotation speed of a shaft of the vehicle engine or a drive shaft. In some embodiments, the vehicle speed sensor comprises an opto-isolator slotted disk sensor, a Hall Effect sensor, a Doppler radar, or the like. The vehicle speed sensor may be provided so that the vehicle processor 128 may determine when the vehicle 118 accelerates, maintains a constant speed, slows down or is comes to a stop.

A steering wheel sensor system may comprise a plurality of sensors located in the steering wheel for determining a driver grip on the steering wheel, the degree of rotation applied to the steering wheel or the forces applied in turning or maintaining the steering wheel. The steering wheel sensor system may provide signals to the vehicle processor 128 indicative of the location and number of hands on the steering wheel, the strength of the grip on the steering wheel, or changes in position of one or more hands on the steering wheel. The steering wheel sensor system, for example, without limitation, may include pressure sensors, inductive sensors, optical sensors, or the like. In addition to detecting the location, number, grip, and change in position of one or more hands on the steering wheel, the steering wheel sensor system may also include one or more sensors indicating the rotational angle of the steering wheel and provide corresponding signals to the vehicle processor 128. Such information may be relevant to driving behaviors of the owner or occupant.

A LIDAR system or light detection and ranging is a system and method of using pulsed laser light to measure distances from the LIDAR system to objects that reflect the pulsed laser light. In embodiments, the LIDAR systems can be used by vehicles to provide detailed 3D spatial information for the identification of objects near a vehicle 118, as well as the use of such information in the service of systems for vehicular mapping, navigation and autonomous operations, especially when used in conjunction with geo-referencing devices such as GPS or a gyroscope-based inertial navigation unit or related dead-reckoning system.

The vehicle UI or user interface device 126 allows the user of the vehicle 118 to interact and control the vehicle. In embodiments, the vehicle UI can be used to provide information regarding the occupants of the vehicle 118 and generate vehicle occupant data. This information may include, but is not limited to a user's preferences for vehicle settings, for example stereo settings, lighting levels, seat settings, and outside communications, personal information, for example, personal identifying information and demographic information, location data, usage data, or the like.

The vehicle API or application programming interface is a set of protocols, routines and tools that allow software applications to communicate with the vehicle 118 processor 128. The vehicle API provides usage data from the vehicle including location data, diagnostic data, maintenance data, trip data, and other information related to the performance and status of the vehicle 118. Other data sources are contemplated and possible, such as vehicle telematics data.

Vehicle performance data is output by the one or more vehicle sensors 134 as described above, for example the proximity sensors, one or more cameras, a global positioning GPS, weather sensors, speed sensors, steering wheel sensors, LIDAR and RADAR systems, vehicle APIs, vehicle-to-vehicle communication paths, and vehicle telematics sensors. The vehicle performance data may relate to how well the vehicle 118 performs, including on speed, acceleration, braking, fuel efficiency, power, torque, handling, suspension and other feedback useful to determining the performance of the vehicle 118. Based upon vehicle performance data, the system 100 may generate the difficult road topography. For example, the difficult road topography may be determined based on one of rates of decelerations, angles of steering, or a road condition, determined from one of the above sensors.

Vehicle occupant data includes data related to the people who are riding in the vehicle 118 at a particular time and may be generated by vehicle sensors 134. For example, vehicle sensors 134 like the cameras and audio sensors can help determine vehicle occupant data related to the number of occupants, physical characteristics, interactions with the vehicle 118 (e.g. conversations using vehicle microphone, interactions with user interface, interactions from connected user devices, etc.), vehicle settings (e.g. seat, air conditioning, music, sound system settings, etc.) and the like. Based upon vehicle performance data, the system 100 may generate the difficult road topography. For example, the difficult road topography may be determined based on one of a driver's discomfort, a driver's alertness, or an occupant's comments.

The data storage component 132 stores historical vehicle performance data and vehicle occupant data. Other data stored in the data storage component 132 may include other sensor data, vehicle ownership data, data about previous accidents the vehicle has been involved in, previous damage to the vehicle, insurance information, registration, demographic information and the like. Other data may include accessory data, for example, tow packages, driving modes, software installed on the vehicle or any other relevant data.

Figure 8:
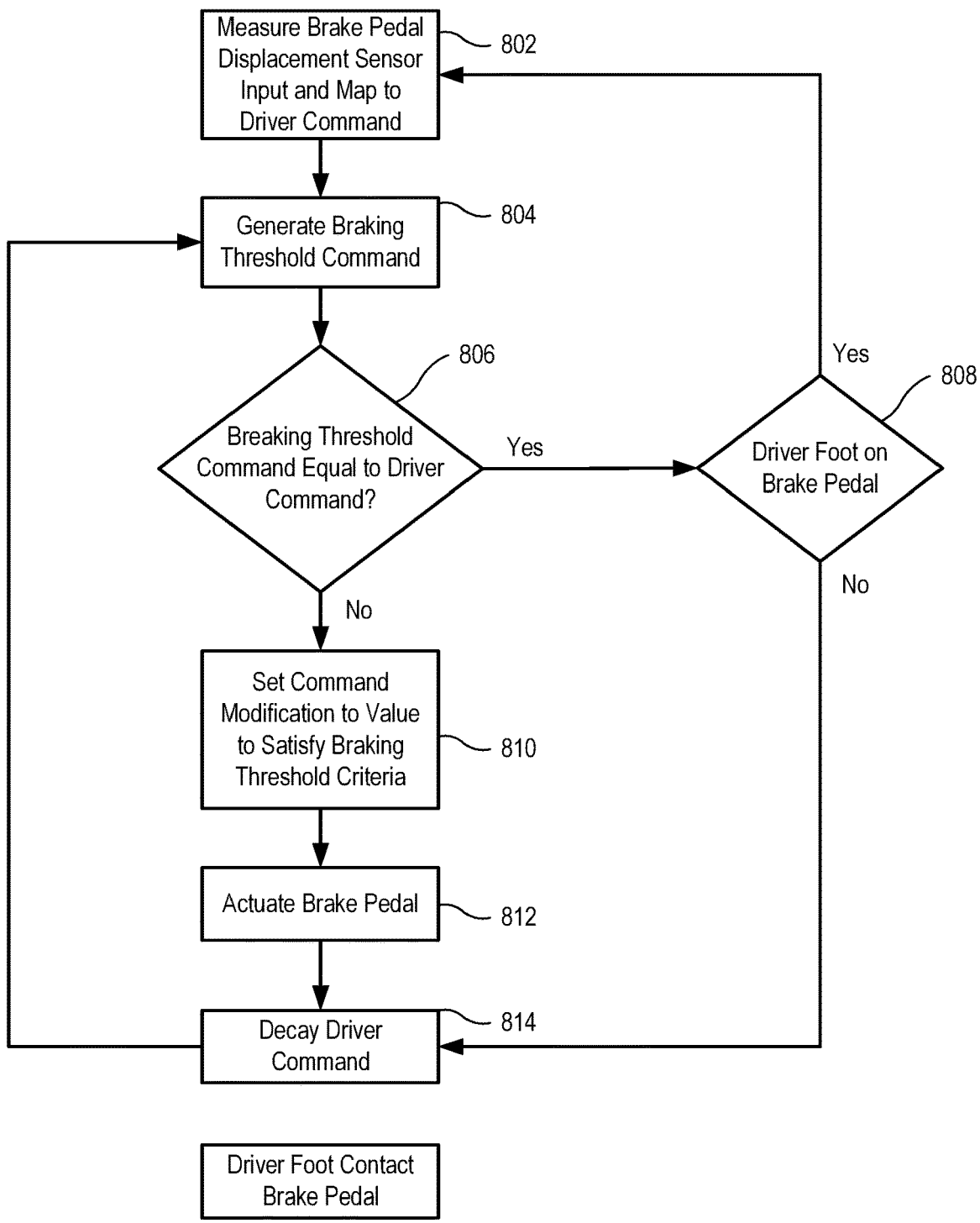
FIG. 8 depicts a flowchart of an example method for a braking control system, according to one or more embodiments shown and described herein.

FIG. 8 illustrates a flow chart 800 of an example control method for applying supplementary automated braking assistance in a vehicle equipped with a brake pedal mechanically coupled to brake calipers. As described above, the method 800 may be carried out by the vehicle processor 128 of the vehicle 118, and can be performed in combination with the model predictive controller 112, the brake control module 114, the pedal sensor module 110, and the pedal actuator 116. The flow chart 800 depicted in FIG. 8 is a representation of a machine-readable instruction set stored in the one or more memories 124 and executed by one or more vehicle processors 128. The process of the flowchart 800 depicted in FIG. 8 may be executed at various times and in response to inputs or other signals from vehicle 111.

At block 802, a brake pedal displacement sensor inputs a signal that is mapped by the brake control module to determine a driver manual braking command value. This driver command reflects the attempted braking input from the driver via the fixed mechanical connection between the pedal and calipers to ensure the current vehicle trajectory satisfies predetermined braking threshold criteria.

At block 804, the model predictive controller generates a controller_command signal, representing the total braking it has calculated as optimal for maintaining vehicle stability and acceptable stopping distances given current state sensor inputs. That is, the model predictive controller calculates a braking value that ensures the vehicle trajectory satisfies a predetermined braking threshold criteria. This controller_command reflects only the model predictive controller's perspective of required braking forces to ensure the vehicle trajectory satisfies a predetermined braking threshold criteria. For example, the model predictive controller continually monitors sensor data like vehicle speed, proximity sensors, and inertial sensors to estimate whether the current vehicle trajectory satisfies predetermined braking threshold criteria. These criteria encode acceptable stopping distances and obstacle avoidance objectives. The model predictive controller determines that braking is required if the current vehicle trajectory violates the criteria—e.g. if closing speed to a leading vehicle indicates inability to stop in an acceptable stopping distance. The model predictive controller then calculates an optimal braking command that changes the current trajectory to instead achieve one satisfying the threshold criteria. This represents the braking forces needed to ensure the vehicle avoids collisions, instability, or loss of control.

At block 806, the brake control module evaluates whether the current manual braking input from the driver's attempted pedal displacement is sufficient on its own to match what the model predictive controller has independently calculated is necessary. That is, the brake control module compares the controller_command signal to the current manual pedal displacement sensor measurements (e.g., driver_command) mapped to a brake force value. If the manual braking value equals or exceeds the automated controller assessment of what would be required to make the vehicle trajectory satisfy the predetermined braking threshold criteria, no supplemental input is deemed necessary. In that case (Yes), method 800 proceeds to block 808 and if the driver's foot is detected on the brake pedal, lets the fixed mechanical linkage between pedal and calipers continue operating without any gap between automated commands and driver input since existing displacement ensures the current vehicle trajectory satisfies predetermined braking threshold criteria. Method 800 then proceeds to block 802. If however, the driver's foot is not on the brake pedal, the method 800 can proceed to block 814 as will be described.

However, at block 806, if the driver is under applying brake pressure relative to what sensors indicate is optimal (No), the braking threshold command will incorporate both increasing manual input as the driver further depresses the pedal as well as a supplemental braking from automated assistance via pedal actuator.

At block 810, the brake control module sets command modification value. Now knowing the total braking forces required to ensure the current vehicle trajectory satisfies predetermined braking threshold criteria per the controller_command output, and having measured the manual braking input from the pedal sensor, the brake control module calculates any discrepancy between what is needed versus what the driver is attempting.

In one example, the brake control module sets the controller_command_modification value to this difference—i.e. the amount of supplementary braking required from automated assistance to supplement the inadequacy in manual input alone. In another example, the the brake control module sets the controller_command_modification value to the value generated by the model predictive controller. This controller_command_modification represents the further amount the pedal actuator will need to depress the pedal beyond the fixed mechanical displacement achieved from the driver's foot, in order to satisfy the braking amount dictated by the controller guidance systems.

At block 812, the pedal actuator actuates the brake pedal per the controller_command_modification value. That is, after comparing the model predictive controller's controller_command to the pedal sensor manual input, the brake control module issues a proportional signal to the pedal actuator. The brake control module commands pedal actuation relative to the command_modification delta, or relative to the necessary braking amount, calculated at block 806. This amount can be the difference between what the driver is attempting to brake manually versus what the model predive controller determines to be optimal or this amount can be what the model predive controller determines to be optimal. In examples, the brake pedal may be moved away from the driver's foot.

At block 814, the driver command is decayed over a controlled taper duration. For example, with supplemental automated braking forces being applied via pedal actuation per block 812, the original manual input from the driver's attempted pedal displacement is now overridden and unable to influence the amount of braking applied. However, the pedal displacement and associated manual braking command signal mapped from it remains monitored in an overridden state by the brake control module. This enables a gradual decay of that isolated manual input. The driver command then trends, or decays, toward zero, while the pedal displacement increments back, with the brake control module managing a smooth tapering decay schedule. The method 800 then proceeds to block 804, where the model predictive controller generates a braking threshold command which can then be compared to the decayed driver command at block 806. Method 800 would continuously loop to reassess if manual-only input can be restored.

As previously discussed, the brake control module and/or the pedal sensor calculates a controlled taper rate for gradually diminishing the disconnected driver command signal toward zero. This adjustable decay rate timing allows a smooth transition from automated or augmented braking control back to the driver having the ability to control braking. In examples, the decay rate is determined as a function of sensor measurements indicating the vehicle's progress toward achieving an updated trajectory per the braking threshold criteria provided by the model predictive controller. The decay rate can be calibrated to decrement relative to the rate of trajectory recovery, dynamically adjusting the taper duration needed before the driver regains braking control.

It should now be understood that embodiments disclosed herein are directed to systems and methods for blended brake control between a driver's manual inputs and autonomous braking assistance. As described above, under normal manual operation, the pedal sensor measures brake pedal displacement proportional to the driver's braking input. The brake control module correlates pedal displacement to hydraulic pressure applied at the calipers. However, if the model predictive controller determines additional braking beyond the driver input is needed to ensure the vehicle trajectory satisfies predetermined braking threshold criteria, the brake control module directs the pedal actuator to further depress the brake pedal. This allows braking forces to increase irrespective of driver input.

As the pedal actuator displaces the brake pedal away from the driver's foot, the pedal sensor continues measuring the driver's attempted but disconnected manual input. This manual input decays as the driver releases pressure on the detached pedal. Simultaneously, braking forces increase due to the pedal actuator further depressing the pedal under model predictive controller control, until sensors indicate the vehicle trajectory satisfies predetermined braking threshold criteria. The pedal actuator then incrementally reduces supplemental automated braking and returns the pedal toward the driver's foot as automated input decays. Full manual control resumes when pedal contact re-establishes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   monitoring a manually applied braking value based on a displacement of a brake pedal mechanically coupled to brake calipers;
   determining that an additional braking value is needed to provide a needed total braking value;
   in response to determining that the additional braking value is needed, applying a controller braking value as the additional braking value by actuating an actuator to physically move the brake pedal away from a foot of a driver;
   decaying the manually applied braking value while the controller braking value is applied;
   detecting, using vehicle sensors coupled to a controller, that application of the needed braking value results in an updated vehicle trajectory that satisfies predetermined braking threshold criteria; and
   after detecting that the updated vehicle trajectory satisfies the predetermined braking threshold criteria, incrementally decreasing the controller braking value and incrementally increasing the manually applied braking value such that the brake pedal incrementally returns to the driver's foot.

2. The method of claim 1, further comprising:
   detecting driver contact with the brake pedal using a pedal contact sensor; and
   resuming manual braking control via a mechanical linkage between the brake pedal and the brake calipers based on the displacement of the brake pedal upon detecting the driver contact.

3. The method of claim 1, wherein determining that the additional braking value is needed comprises inputting one or more of: the displacement of the brake pedal, a brake pedal displacement rate, a vehicle speed value, vehicle environment data, a vehicle trajectory value, a vehicle pitch/yaw/roll value, or a vehicle inertia value into a model predictive controller model that provides the additional braking value.

4. The method of claim 1, wherein decaying the manually applied braking value comprises calculating a decay rate for the manually applied braking value based on the vehicle achieving the updated vehicle trajectory that satisfies the predetermined braking threshold criteria.

5. The method of claim 4, wherein incrementally increasing the manually applied braking value comprises calculating a restoration rate for the manually applied braking value based on the decay rate of the controller braking value.

6. The method of claim 1, further comprising detecting the driver contact when the brake pedal reaches a predetermined pedal displacement position relative to an initial pedal position when the controller braking was applied.

7. The method of claim 1, wherein detecting the driver contact comprises detecting a pedal force applied by to the pedal using a force sensor in the brake pedal.

8. The method of claim 1, wherein actuating the actuator to physically move the brake pedal away from the foot of the driver comprises:
   mechanically separating a mechanical linkage between the brake pedal and the brake calipers; and
   controlling displacement of the brake pedal independently of the brake calipers.

9. The method of claim 8, wherein incrementally returning the brake pedal to the foot of the driver comprises mechanically reconnecting ends of the mechanical linkage.

10. The method of claim 1, further comprising alerting a driver via a visual or audible alert when transitioning from the manual braking control to the controller braking value being applied.

11. A method of braking control in a vehicle, the method comprising:
    receiving a manual brake input from a brake pedal having a mechanical connection to brake calipers;
    monitoring vehicle sensor data to determine whether a trajectory of the vehicle satisfies predetermined braking threshold criteria;
    when the vehicle trajectory fails to satisfy the predetermined braking threshold criteria, locking the mechanical connection and applying autonomous brake input while preventing the manual brake input from actuating displacement of the brake calipers;
    monitoring subsequent vehicle sensor data to identify when the vehicle trajectory satisfies the predetermined braking threshold criteria; and
    upon the vehicle trajectory satisfying the predetermined braking threshold criteria, incrementally restoring the mechanical connection by electronically synchronizing decay of the autonomous brake input with return of the manual brake input until detecting driver contact with the brake pedal through the mechanical connection.

12. The method of claim 11, wherein monitoring vehicle sensor data to determine whether vehicle trajectory satisfies the predetermined braking threshold criteria comprises estimating whether a collision is anticipated based on object proximity detection sensors on the vehicle.

13. The method of claim 11, wherein locking the mechanical connection comprises disengaging a selectively controllable coupling integrated in the mechanical connection between the brake pedal and brake calipers.

14. The method of claim 11, wherein the autonomous brake input is determined by a model predictive controller based on the vehicle sensor data.

15. A braking control system comprising:
a brake pedal mechanically coupled to brake calipers;
a pedal displacement sensor configured to monitor brake pedal displacement;
a pedal contact sensor configured to detect contact between the brake pedal and a foot of a driver;
vehicle sensors configured to measure vehicle parameters;
a controller in communication with the pedal displacement sensor, the pedal contact sensor, and the vehicle sensors, the controller configured to:
determine a manually applied braking value based on the brake pedal displacement; determine an additional braking value based on the vehicle parameters;
based on the additional braking value, control an actuator to physically move the brake pedal away from a driver's foot and apply a controller braking value;
decrease the controller braking value based on the vehicle parameters; and
increase the manually applied braking value as the controller braking value decreases until an indication received from the pedal contact sensor indicates the brake pedal is in contact with the foot of the driver.

16. The system of claim 15, wherein the controller comprises a model predictive controller configured to determine the additional braking value based on the vehicle parameters.

17. The system of claim 16, wherein the vehicle parameters include at least one of: a vehicle speed value, vehicle environment data, a vehicle trajectory value, a vehicle pitch/yaw/roll value, or a vehicle inertia value.

18. The system of claim 15, wherein the pedal contact sensor comprises a pedal force sensor configured to detect a pedal force indicative of the foot of the driver contacting the brake pedal.

19. The system of claim 15, further comprising a blended braking module configured to combine the manually applied braking value and the controller braking value when the controller determines that blended braking control satisfies operational constraints.

* * * * *

UNITED STATES PATENT AND TRADEMARK OFFICE
CERTIFICATE OF CORRECTION

| | | |
|---|---|---|
| PATENT NO. | : 12,403,875 B2 | Page 1 of 1 |
| APPLICATION NO. | : 18/428433 | |
| DATED | : September 2, 2025 | |
| INVENTOR(S) | : Matthew J. Brown | |

It is certified that error appears in the above-identified patent and that said Letters Patent is hereby corrected as shown below:

On the Title Page

Item (71), applicant, city, delete "Aichi-ken (JP)" and insert --Toyota-shi Aichi-ken (JP)--, therefor.

Item (73), assignee, city, delete "Toyota (JP)" and insert --Toyota-shi Aichi-ken (JP)--, therefor.

In the Specification

In Column 1, Line(s) 38, after "for", delete "a".

In Column 1, Line(s) 55, after "until", delete "the".

In Column 5, Line(s) 66, after "additional", insert --information--.

In Column 9, Line(s) 48, after "or", delete "is".

In Column 10, Line(s) 37, after "including", delete "on".

In Column 12, Line(s) 21, delete "the the" and insert --the--, therefor.

In Column 12, Line(s) 39, delete "predive" and insert --predictive--, therefor.

In Column 12, Line(s) 40, delete "predive" and insert --predictive--, therefor.

In the Claims

In Column 14, Line(s) 29, Claim 7, after "applied", delete "by".

Signed and Sealed this
Twenty-first Day of October, 2025

John A. Squires
*Director of the United States Patent and Trademark Office*